E. C. FISHER.
MANIFOLDING SALES BOOK.
APPLICATION FILED NOV. 23, 1914.
1,217,166.
Patented Feb. 27, 1917.
2 SHEETS—SHEET 1.
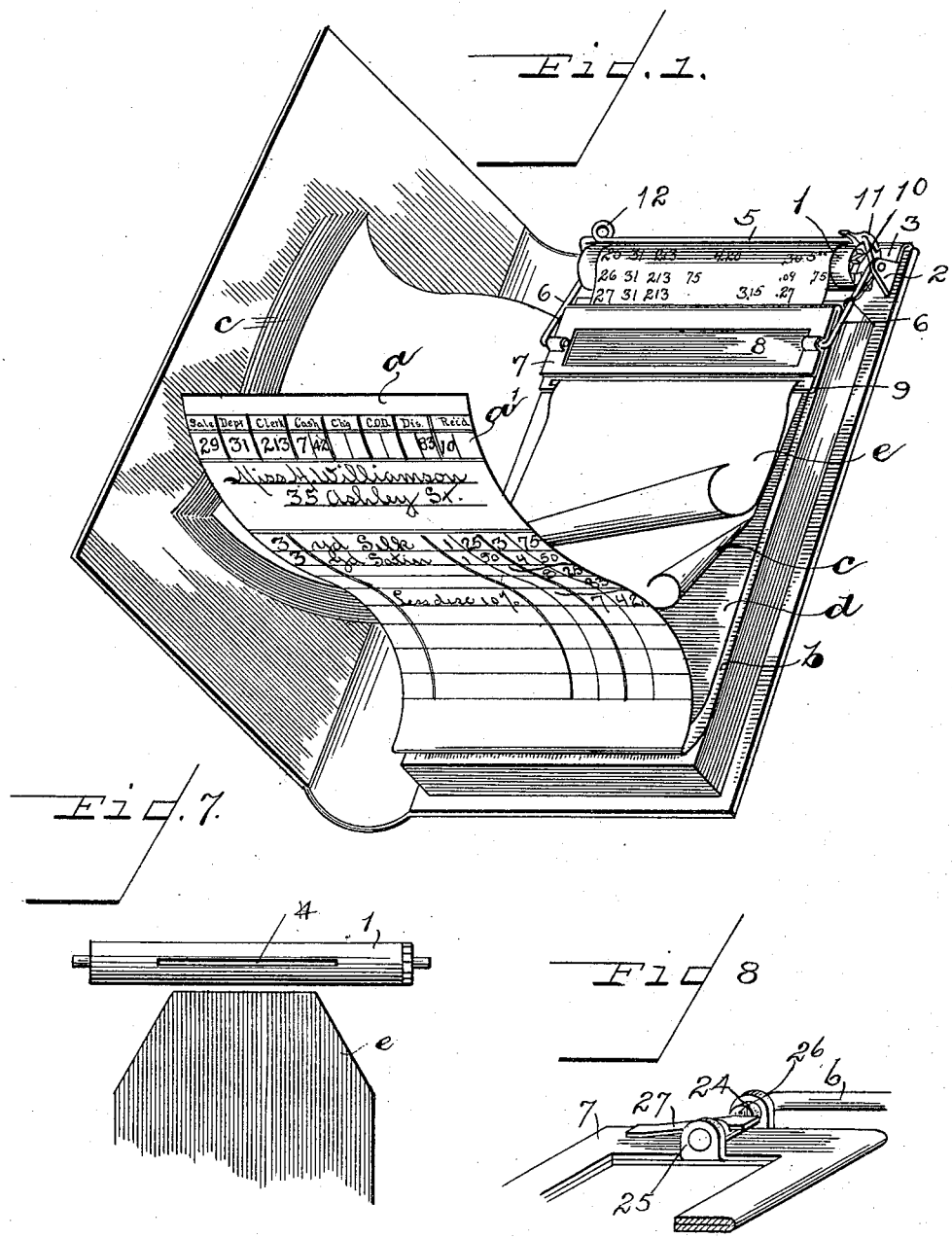

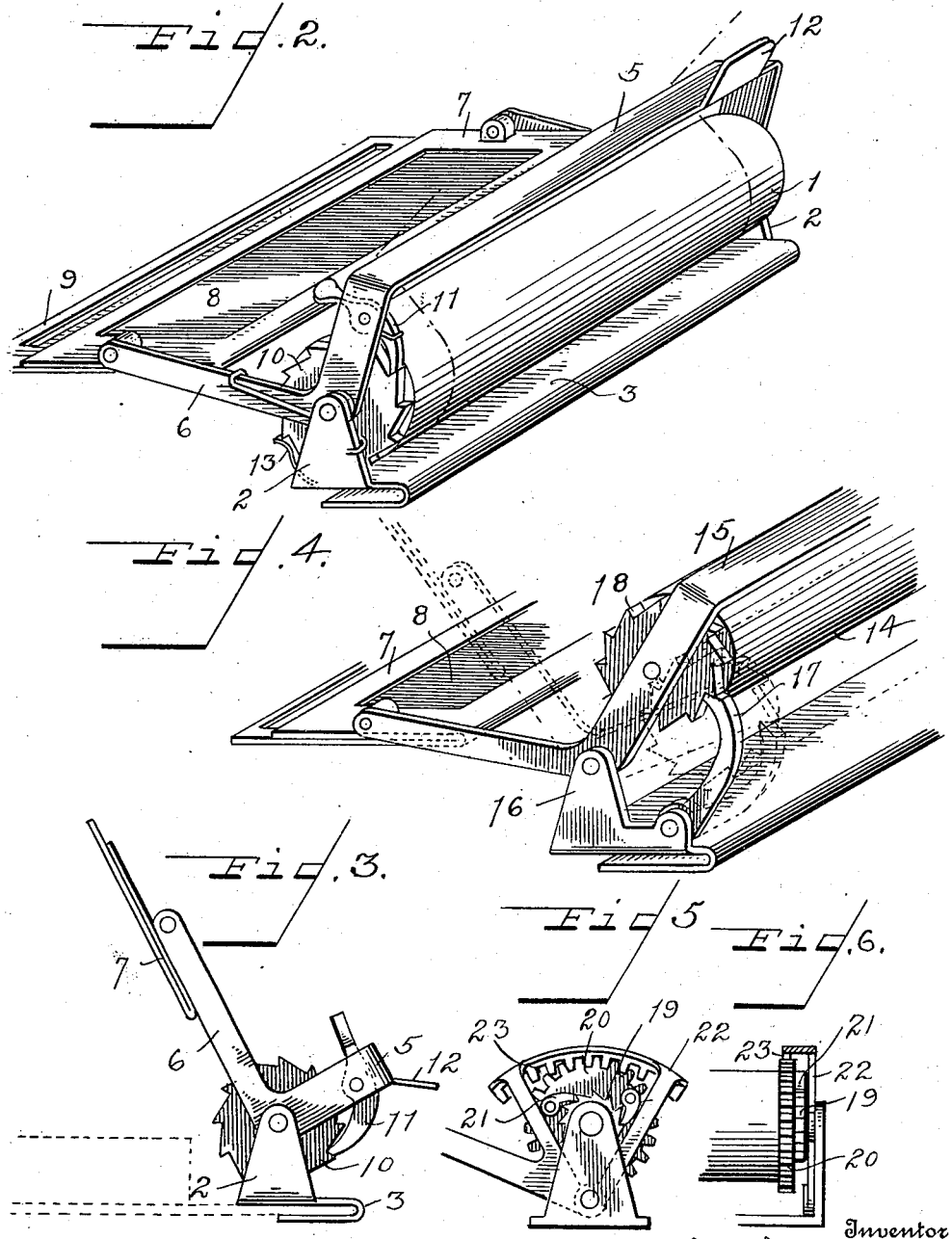

UNITED STATES PATENT OFFICE.

EDGAR C. FISHER, OF DAYTON, OHIO.

MANIFOLDING SALES-BOOK.

1,217,166.     Specification of Letters Patent.     Patented Feb. 27, 1917.

Application filed November 23, 1914. Serial No. 873,596.

*To all whom it may concern:*

Be it known that I, EDGAR C. FISHER, citizen of the United States, residing at Dayton, in the county of Montgomery and State of Ohio, have invented certain new and useful Improvements in Manifolding Sales-Books, of which the following is a specification.

My invention relates to manifolding sales books and particularly to an attachment therefor by which there may be produced upon a single record sheet a carbon copy or duplicate original record of a synopsis of the successive transactions.

The object of the invention is to simplify the structure as well as the means and mode of operation of such devices whereby they will not only be cheapened in construction, but will be more efficient in use, easily operated, positive in action, and unlikely to get out of repair.

It is the custom at the present time, in recording sales transactions, to produce an original sales record slip and a duplicate sales record slip or customer's check and in addition thereto a tissue record slip for checking or auditing purposes. These several slips are produced by a single writing operation by means of interposed carbon sheets so that the duplicate sales slip or customer's check and the tissue slip are exact reproductions of the entry upon the original sales slip. In addition to providing these records the clerk is required to keep a separate record of consecutive sales upon a separate sheet or leaf usually carried in the sales book and known as the tally sheet. The record upon the tally sheet being made separate and independent of the original sales record, errors frequently occur through the negligence of the clerk to enter the sale upon the tally sheet or by entering figures upon the tally sheet different from those upon the original sales record or by entering the amount in the wrong column or upon the wrong line. This tendency toward errors in the entering of sales upon the tally sheet necessitates careful auditing of the sales records and necessitate the comparison of the sales checks with the tally sheet.

One of the primary objects of the present invention is to provide means for producing an original tally record, *i. e.*, for making the tally entries of consecutive sales upon a single sheet simultaneously with the entry of the original sales record upon the sales slip. By making the tally record a duplicate of the original record the possibility of errors made in carrying the data of the sale to the tally sheet is eliminated. The method herein described further discourages fraud and saves the time of the sales-person inasmuch as one writing produces all records including the tally record. It further reduces to minimum the cost and labor of auditing the sales by comparison of the sales checks with the tally.

I am aware that sales books have heretofore been provided with continuous record strips upon which are reproduced records of consecutive transactions. However, such recording devices have heretofore been arranged to reproduce the entire sales record upon the continuous record strip and it was necessary to advance the record strip the required distance after each operation by a special operation. In such devices no means was provided for insuring the advance of the record strip.

Further objects of the present invention are to provide upon the tally sheet a synopsis of consecutive transactions identifying the number of the sale, the department, and the clerk, and further designating whether the sale is cash, charge, or C. O. D., the amount of the discount, if any, and the amount tendered. This data or synopsis only, which is a reproduction of that entered upon the original sales slip is simultaneously reproduced upon the tally sheet and the tally sheet is automatically advanced after each transaction.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a perspective view of a manifolding sales book to which the invention forming the subject matter hereof has been applied. Fig. 2 is an enlarged perspective view of the tally sheet operating mechanism forming the subject matter hereof. Fig. 3 is a side elevation of the construction shown in Fig. 2 in its operated position. Fig. 4 is a perspective view of a modification of the tally sheet operating mechanism. Figs. 5 and 6 are detail views of a further modification thereof. Fig. 7 is a detail view of the receiving roller and the end of the tally sheet to be engaged therewith. Fig. 8 is a detail view of a modification of the connection of the carrying arm with the carbon carrier.

Like parts are indicated by similar characters of reference throughout the several views.

The device forming the subject matter hereof is applicable to sales books as now commonly constructed and arranged. The sales book itself forms no part of the present invention. In the drawing there has been shown a popular form of sales book now in common use adapted to produce at a single writing an original sales check, a duplicate sales check, and a tissue record. By the use of the device herein described there is produced at the same writing an additional record, viz., that upon the tally sheet. While the device has been shown in connection with a book designed to produce triplicate sales slips it is to be understood that it is equally applicable to sales books arranged to produce either duplicate or single sales slips.

Referring to the drawings, $a$ is the original sales slip and $b$ the duplicate sales slip. In the drawing these have been shown in the form of a single strip folded upon itself. The tissue record sheet $c$ is turned for use to a position intermediate the original slip $a$ and duplicate slip $b$. A double faced carbon sheet $d$ is interposed between the tissue record sheet $c$ and the duplicate sales slip $b$. By writing upon the original slip $a$, a duplicate record is produced upon the slip $b$ and at the same time upon the under side of the tissue record sheet $c$. The latter record is read through the tissue sheet. The original sales slip $a$ is provided at its top with a suitable ruling, as at $a^1$, in which to enter a synopsis of the sale such as the number of the sale, the department, the clerk number, the amount of the sale, whether cash, credit, or C. O. D., the discount, and the amount tendered. This is the usual arrangement and operation as now commonly practised. It is to be understood that the tissue record sheet $c$ may be omitted or both the sheet $c$ and the slip $b$ may be omitted. The form of book thus far described is now in common use and forms no part of the present invention.

Interposed between the record sheet $c$ and the original sales slip $a$ is the tally sheet $e$ to which the present invention pertains and upon which are produced in consecutive order the synopsis of consecutive sales. One end of the tally sheet $e$ is connected with a revoluble roller 1 journaled in brackets 2—2 suitably carried upon the frame or cover of the book.

The brackets 2—2 may be secured to the book frame or cover by any well known method but in the drawing have been shown connected one to the other by a transverse plate or base 3 which is folded upon itself and adapted to clamp the upper edge of the book within the fold. By this means the brackets 2—2 are detachably engaged with the book frame or cover. The brackets 2—2, however, may be permanently secured thereto if so desired. The book cover together with the brackets 2—2 which may be connected with the cover by means of the base 3 or otherwise constitutes the main frame of the structure upon which the sales slips are supported. Having thus identified the structure including the book cover, the base and the brackets 2—2 to which the swinging arms are pivoted as the main frame of the structure, it is thought to be perfectly proper to say that the arms are pivotally connected to the main frame inasmuch as they are connected with the brackets and the brackets connected with the cover and the brackets and cover with their intermediate connection constitute the main frame.

The end of the tally sheet $e$ may be connected with the roller 1 in any suitable manner. In the drawing, the roller has been shown provided with a longitudinal slot 4 and the end of the sheet is somewhat tapered to facilitate its engagement within the slot.

Pivoted to the brackets 2—2 concentric with the shaft 1 is an oscillatory frame 5 provided with radially disposed arms 6. Intermediate the radial arms 6 and pivoted thereto is a carrier 7 for a transverse strip of carbon material 8. The carrier 7 may be of any desired size or construction and a carbon sheet 8 may be secured thereto in any suitable manner. In the drawing a very simple form of holder or carrier is illustrated comprising a sheet of metal folded upon itself and having therein registering openings or wide slots covered by the carbon material 8 which is inserted between the folds of the plate where the carbon material is removably held by the clamping action of the folded plate.

One edge of the folded plate projects beyond the other, as indicated at 9, and is provided with a transverse narrow slot through which the tally sheet $e$ extends. This slot in the projecting portion of the carrier serves as a guide for the tally sheet. The engagement of the tally sheet in the slot 9 not only guides the sheet in its movement to the roller 1 but also causes the tally sheet to be carried upward with the carbon carrier upon the oscillation of the carrying arms 6. It is to be understood that the material forming the carbon holder or carrier is extremely thin so that it does not interfere with the writing operation.

The roller 1 is provided at its extremity with a ratchet wheel 10 engaged by a pawl 11 carried upon the oscillatory frame 5. The frame 5 is preferably, though not necessarily, provided with a finger hold 12. After each transaction it is necessary to withdraw the succeeding original slip *a* from beneath the carbon sheet *d* and to place a new tissue sheet *c* intermediate the new original sales slip and the carbon sheet. Before this can be done it is necessary to elevate the carbon carrier or holder 7 by oscillating the frame 5. The oscillation of the frame 5, as shown in Fig. 3, advances the roller 1 a predetermined distance by the engagement of the pawl 11 with the ratchet wheel 10. This winds the tally sheet *e* upon the roll 1, drawing the sheet beneath the carbon holder or carrier 7.

The oscillation of the frame 5 not only elevates the carrier or carbon holder but carries the tally sheet *e* upward therewith to facilitate the placing of the tissue sheet beneath the same. On its return movement the frame 5 moves independent of the roll 1 which is held in its adjusted position by a spring detent 13. Thus at each operation the tally sheet is advanced by the oscillation of the frame 5 a sufficient distance to present an unmarked portion of the surface thereof beneath the carbon 8 within the holder or carrier 7.

The carrier or holder 7 is so located in relation with the supply of sales slips that the blank spaces for the recording of the synopsis of the sale upon the record slips will register with the opening in the carrier or holder 7 whereby such data or synopsis will be transferred by the carbon material 8 to the surface of the tally sheet *e*. Inasmuch as the carbon material 8 extends only beneath the rulings for the synopsis of the sale, the remainder of the sales record is not transferred to the tally sheet but is reproduced by the carbon sheet *d* upon the duplicate sales slip and the under side of the tissue sheet only. The tally sheet thus receives only the synopsis of the sale and is advanced automatically at each operation of the book preparatory to recording the next transaction.

These books are commonly arranged with a series of twenty-five or fifty sales checks. The tally sheet *e* is of the length to contain only the data for a corresponding number of sales. When the tally sheet *e* is first inserted it will extend substantially to the bottom edge of the book. However, as the transactions are recorded, the tally sheet is wound upon the roll 1 and is drawn upward through a step by step movement.

When it is desired to remove the tally sheet the free end thereof is drawn from beneath the carrier or holder 7 and is turned backward over the top of the frame 5, as shown by dotted lines in Fig. 2. The tail of the pawl 11 is then depressed to disengage the pawl from the ratchet wheel 12 and the tally sheet is drawn from the roll over the edge of the frame 5 which serves to straighten the sheet, removing any curl due to the winding of the sheet upon the roll.

The construction thus described is capable of various modifications. In Fig. 1 the oscillatory frame and carrying arms are shown constructed of wire whereas in Fig. 2 and subsequent figures the frame is shown as stamped from sheet metal. When the frame is constructed of wire, as shown in Fig. 1, the pawl 11 may be journaled upon the transverse portion of the frame. In Fig. 1 the device is shown mounted at the top of the sales book and the sales slip is shown provided with rulings at the top for recording the data or synopsis of the scale. In some systems of accounting it may be found more convenient to locate the rulings for the synopsis at the bottom of the sales slip instead of at the top thereof. In such case the receiving roll for the tally sheet with its operating frame and support are mounted at the bottom of the book instead of the top thereof. This would merely involve reversing the direction of movement of the tally sheet *e* and connecting the slips *a* and *b* at the top instead of at the bottom. It is equally obvious that the device may be secured to the side of the book and the tally sheet moved laterally if so desired. In such case the data or synopsis would be written in a vertical column adjacent to the edge of the sales slip. These changes being merely changes in location of the appliance and not changes in the construction or within the ability of any one skilled in the art and are not necessary to be illustrated.

In Fig. 4 there is shown a modification in which the roller 14 corresponding with the roll 1 is journaled in the oscillatory frame 15 which in turn is pivoted to suitable supporting brackets 16 secured to the book frame or cover. The frame 15 is provided with radial arms supporting the carbon holder or carrier before described. It will be noted that in this construction the roll 14 describes an arcuate movement in unison with the oscillatory movement of the frame 15. A pawl 17 pivoted to the base or support of the device engages a ratchet wheel 18 carried by the roll 14 and as the roll is oscillated by the movement of the frame the pawl serves to rotate the roll within the frame. The operation of the device is similar to that before described.

In Figs. 5 and 6 there is shown a further modification. In this construction the roll is provided with a ratchet wheel 19 and adjacent thereto there is loosely mounted upon the shaft of the roll a gear pinion 20. Spring pressed pawls 21 carried by the gear pinion engage the ratchet 19 to rotate the ratchet wheel and the roll connected therewith in unison with the movement of the gear pinion in one direction. The gear is capable of oscillatory movement in the other direction independent of the roll and ratchet wheel. The oscillatory frame 22 is provided with an arcuate rack or gear sector 23 which engages the gear pinion. The oscillation of the frame actuates the gear pinion to rotate the roll and ratchet wheel. The gear rack or sector being of greater radius than the gear pinion, the latter is operated through an increased degree of movement.

In Fig. 8 there is shown in detail a construction designed to induce the return of the carrier or carbon holder 7 to a position in predetermined relation with the carrying arms 6 whenever the carrier or holder 7 is elevated from engagement with the sales slip. In this construction the carrying arm 6 is provided with a stud or pin 24 pivotally engaged in ears or lugs 25 upon the carrier or holder 7. This pin 24 is flattened or cut away as at 26 intermediate the lugs or ears and a flat spring 27 secured to the carrier or holder 7 engages the flat portion of the pin. Any rotary movement of the parts from normal position places the spring 27 under tension. The spring tends to return the parts to normal position when released.

During the normal operation or use of the device the frame or carrier 7 for carbon material rests upon the supply of sales slips and extends into the path of said sales slips in their adjustment from supply position to position of use. In other words, it is necessary to elevate the swinging arms 6 and frame or carrier 7 in order that the original sales slip *a* may be withdrawn from the supply pack beneath the frame or carrier and in order that a tissure sheet *c* may be placed beneath the carrier 7. This insures the proper operation of the device to advance the tally sheet or strip *e* after each transaction.

From the above description it will be apparent that there is thus provided a device of the character described possessing the particular features of advantage before enumerated as desirable but which obviously is susceptible of modification in its form, proportion, detail construction, or arrangement of parts without departing from the principle involved or sacrificing any of its advantages.

While in order to comply with the statute the invention has been described in language more or less specific as to certain structural features, it is to be understood that the invention is not limited to any specific details but that the means and construction herein described comprise but one mode of putting the invention into effect and the invention is therefore claimed broadly in any of its possible forms or modifications within the scope of the appended claims.

Having thus described my invention, I claim:

1. In a manifolding sales book, a holder for a plurality of sales slips, a roller journaled in fixed relation with the sales slip holder, an oscillatory frame normally overlying the sales slips within the holder, and interconnecting means between the frame and roller whereby said frame is adapted by its swinging movement necessarily to afford access to said sales slips to actuate the roller to advance a record strip.

2. In a manifolding sales book, a holder for a plurality of sales slips, a roller journaled in fixed relation with the sales slip holder, adapted by its rotation to advance a record strip, a swinging frame journaled concentric with the roller, and means to actuate the roller by the oscillation of the frame.

3. In a manifolding sales book, a holder for a plurality of sales slips, a roller adapted by its rotation to advance a record strip, a base in which the roller is journaled, means for detachably engaging the base with the sales slip holder, and an oscillating actuating member adapted to actuate said roller to wind said strip thereon.

4. In a manifolding sales book, a holder for sales slips, a movable member overlying said sales slips, a roller adapted by its rotation to advance a record strip, a detachable base in which the roller is journaled supported on the said holder, and means to actuate said roller by the movement of said movable member.

5. In a manifolding sales book, a holder for a plurality of sales slips, a recessed base member detachably engaging the edge of the holder, a roller carried by said base and a manually operated oscillatory member mounted on said base for actuating the roller to advance a record strip substantially as specified.

6. In a manifolding sales book, a main frame, a holder for duplicating material, swinging arms pivoted to the main frame and supporting said holder for duplicating material, a roller journaled concentric with the pivotal connections of the arms, and means for rotating the roller to advance a record strip by the oscillation of the arms.

7. In a manifolding sales book, a holder for a plurality of sales slips, a roller journaled in fixed relation with said holder, swinging arms pivoted concentric with said roller, and a guide for a record strip carried by the said arms, the record strip being advanced through the guide by the operation of said roller, and means to actuate the roller by the oscillation of said arms.

8. In a manifolding sales book, a holder for sales slips, a roller journaled in fixed relation with the holder and adapted by its rotation to advance a record strip, a movable member normally extending into the path of succeeding sales slips in their adjustment to operative position, and means for actuating the roller by the movement of said movable member.

9. In a manifolding sales book, a holder for sales slips, a roller supported upon said holder adapted by its rotation to advance a record strip, a movable member normally overlying the sales slips and movable out of the path of succeeding sales slips to permit their adjustment to operative position, and means to actuate the roller by the movement of said member from normal position.

10. In a manifolding sales book, a main frame supporting a plurality of sales slips, a roller supported upon said main frame and adapted by its rotation to advance a record strip, swinging arms pivoted to said main frame, and a swinging member pivoted to the arms and capable of oscillatory movement independent of the oscillation of the arms by which said record strip is carried and means to actuate the roller to advance the strip by the movement of the arms.

11. In a manifolding sales book, a main frame supporting a plurality of sales slips, swinging arms pivoted to said main frame, a guide for a longitudinally movable record strip carried by said arms, and means to advance the strip by the oscillation of the arms.

12. In a manifolding sales book, an oscillatory frame, a support for sales slips to which the frame is pivoted, a roller journaled within the frame, a guide for a record strip carried by the frame, and means to actuate the roller to advance the record strip by the oscillation of the frame.

13. In a manifolding sales book, a holder for a plurality of sales slips, a roller journaled in fixed relation with the said holder and adapted by its rotation to advance a record strip, a manually operated oscillatory actuating member for said roller for actuating the roller by the movement of said member.

14. In a manifolding sales book, a holder for a plurality of sales slips, parallel carrying arms supported thereon, a carrier for duplicating material pivoted to said arms and capable of oscillatory movement in relation therewith, and yielding means tending to maintain the carrier in predetermined relation with the arms.

15. In a manifolding sales book, a support for a plurality of sales slips, a carrier for duplicating material, a movable support therefor and means for advancing a longitudinally movable record strip through intermittent movement by the movement of the duplicating material carrier support.

16. In a manifolding sales book, a main frame, a carrier for duplicating material, an oscillatory supporting member upon which the carrier is supported and means for advancing a record strip intermittently in a longitudinal direction by the oscillation of the carrier supporting member.

17. In a manifolding sales book, clamping means adapted to hold a plurality of sales slips, a roller upon which a record strip is adapted to be wound, and means actuated by the movement of the clamping means from engagement with the sales slips adapted to operate the roller to wind the record strip thereon.

In testimony whereof I hereunto set my hand this twentieth day of November, 1914.

EDGAR C. FISHER.

Witnesses:
FRANK R. WRIGHT,
ERNEST E. WALDO.

Copies of this patent may be obtained for five cents each, by addressing the "Commissioner of Patents, Washington, D. C."